United States Patent [19]

Metzger, Jr.

[11] Patent Number: 5,287,779
[45] Date of Patent: Feb. 22, 1994

[54] RADIAL SAW SAFETY GUARDS AND BARRIERS

[75] Inventor: James I. Metzger, Jr., Ballwin, Mo.

[73] Assignee: Emerson Electric Co., St. Louis, Mo.

[21] Appl. No.: 31,344

[22] Filed: Mar. 15, 1993

[51] Int. Cl.$^5$ .................. B27B 5/20; B27G 19/02; B27G 19/08

[52] U.S. Cl. .................. 83/102.1; 83/471.3; 83/478; 83/486.1; 83/521; 83/DIG. 1

[58] Field of Search .............. 83/102.1, 471.3, 473, 83/477.1, 478, 486.1, 489, 521, DIG. 1

[56] References Cited

U.S. PATENT DOCUMENTS

| | | | |
|---|---|---|---|
| 2,926,709 | 3/1960 | Kaley | 83/478 |
| 3,596,033 | 7/1971 | Wickham | 200/168 |
| 3,656,519 | 4/1972 | Stackhouse | 83/102.1 |
| 3,880,032 | 4/1975 | Green | 83/102 |
| 3,884,101 | 5/1975 | Silkin | 83/544 |
| 3,913,437 | 10/1975 | Speer et al. | 83/478 |
| 4,043,237 | 8/1977 | Pyle | 83/478 |
| 4,150,598 | 4/1979 | Berends et al. | 83/478 |
| 4,176,571 | 12/1979 | Batson | 83/397 |
| 4,532,841 | 8/1985 | Stackhouse, Jr. | 83/102.1 |
| 4,553,462 | 11/1985 | Silken | 83/471.3 |
| 4,958,544 | 10/1990 | Miyamoto | 83/471.3 |
| 5,199,343 | 4/1993 | O'Banion | 83/397 |

*Primary Examiner*—Hien H. Phan
*Attorney, Agent, or Firm*—Polster, Lieder, Woodruff & Lucchesi

[57] ABSTRACT

A radial saw with safety guards and barriers for rip cutting and cross cutting of workpieces is disclosed. The radial saw includes a motor driven saw blade that is mounted on the supporting arm which overhangs a worktable. The motor driven saw blade is movable relative to a worktable mounted rip fence to enable the motor driven saw blade to be operated for rip cutting workpieces longitudinally along the length of the rip fence and for cross cutting workpieces transverse to the rip fence. An upper blade guard is mounted in fixed position relative to a yoke depending from the supporting arm for covering approximately an upper half of the motor driven saw blade. A lower blade guard depends from the upper blade guard and substantially covers approximately the lower half of the motor driven saw blade when resting on the worktable. The lower blade guard is mounted to the upper blade guard for automatic upward and downward movement relative to the upper blade guard when resting upon workpieces of different thickness to protect the user against contact with the motor driven saw blade. The lower blade guard protects a user against contact with the side of the motor driven saw blade when set up for cross cutting and also against contact against the leading edge of the motor driven saw blade when set up for cross cutting. During rip cutting, the lower blade guard protects against contact at an outfeed end, through the use of a wrong way feed barrier associated with the lower blade guard.

25 Claims, 8 Drawing Sheets

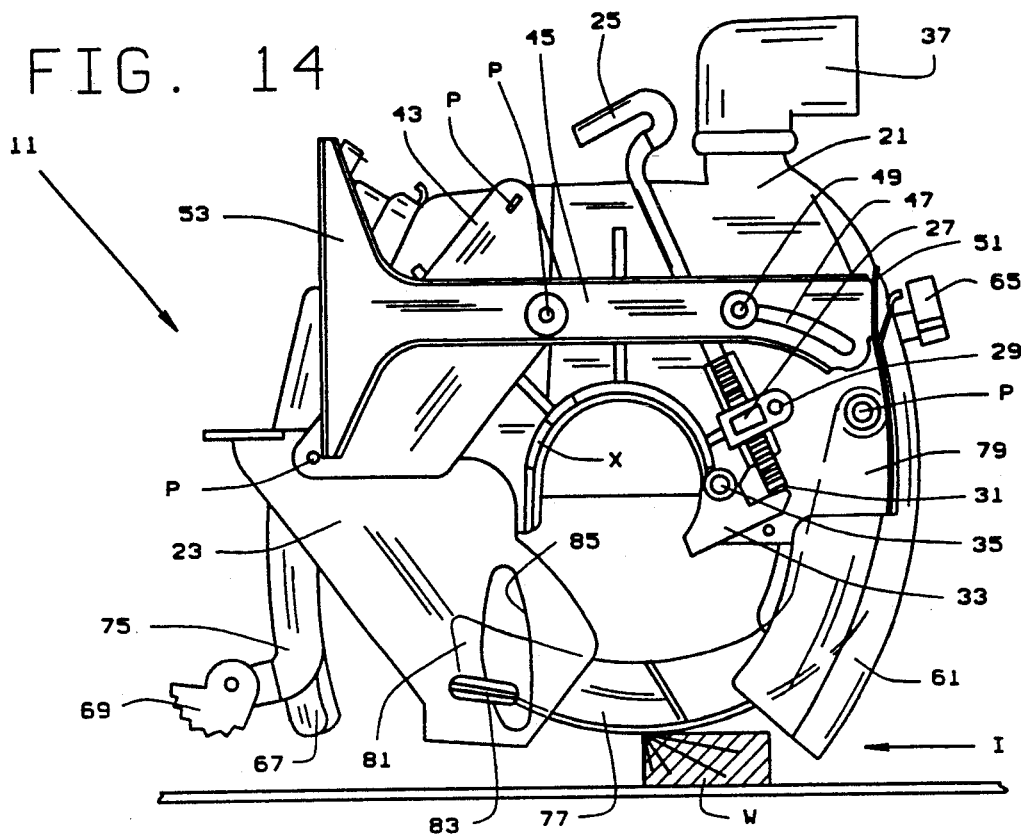
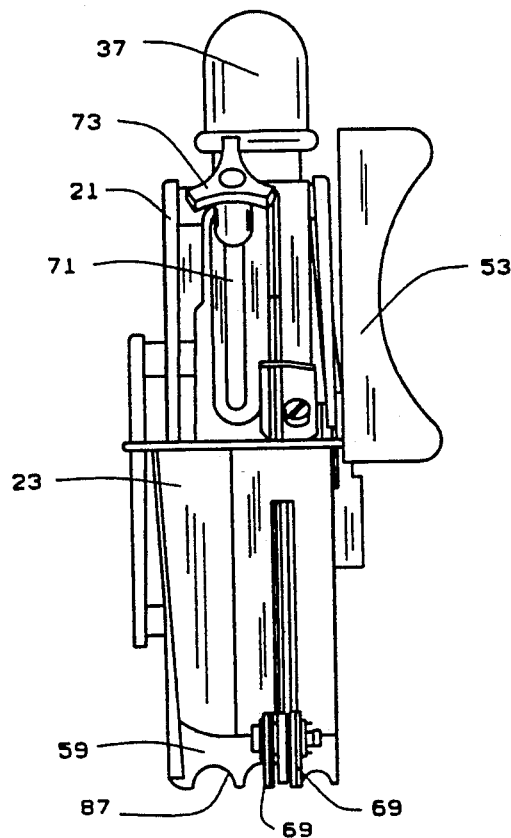
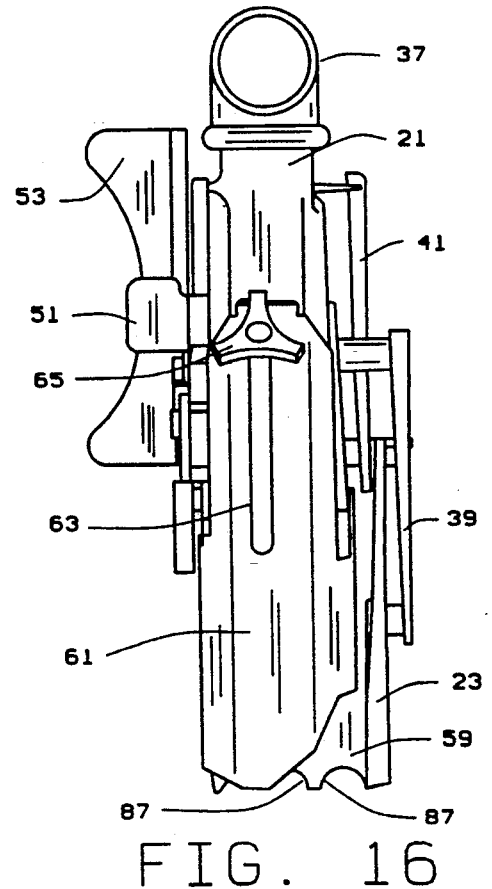

RADIAL SAW SAFETY GUARDS AND BARRIERS

CROSS REFERENCE TO RELATED APPLICATIONS

This is a copending application to Ser. No. 08/031,345 dated Mar. 15, 1993 entitled RADIAL ARM SAW GUARD WITH OPERATIONAL INTERLOCK, and Ser. No. 08/038,681 dated Mar. 15, 1993 entitled INDEPENDENTLY AND JOINTLY OPERABLE RADIAL SAW GUARDS.

BACKGROUND OF THE INVENTION

The present invention relates to a radial saw with safety guards and barriers for rip cutting and cross cutting of workpieces, and more particularly, to a radial saw which incorporates blade guards and barriers to enhance the safety and operation of the radial saw.

Typically, a radial saw is mounted on a supporting arm that overhangs a worktable. The supporting arm is mounted at an upper end of a base or column that extends upwardly from one end of a worktable. A motor driven saw blade is pivotally and slidably mounted to the supporting arm for operating the motor driven saw blade in rip cutting workpieces longitudinally along the length of a rip fence or for cross cutting of workpieces transverse to the rip fence.

Because the radial saw is operated in fixed and moving relationship in two different directions for rip cutting and cross cutting, different safety hazards can arise from improper use of the radial saw. In order to fully appreciate the nature of the safety hazards involved in rip cutting and cross cutting, it is important to understand the nature of the rip cutting and cross cutting operations. Rip cutting involves the changing of the width of a workpiece by cutting along its length. The workpiece is fed into the motor driven saw blade, which rotates in a fixed position, parallel to a rip fence, and at a set distance from the rip fence, enabling the fence to serve as a guide for the workpiece to be cut. Cross cutting, on the other hand, is cutting a workpiece to length. The workpiece is held firmly against the workpiece fence, and the blade is pulled through the workpiece to make the cut. Straight, bevel, miter and compound cuts can be made.

The safety hazards associated with rip cutting include outfeed zone hazard, kickback and wrong way feeding. If the operator reaches around the blade to the outfeed side and tries to hold or pull the workpiece through, the rotational force of the blade can pull the hand back into the blade. Therefore, touching, holding or pulling on the outfeed of a workpiece, while the blade is still spinning, can result in fingers, hand or an arm being cut off. Kickback occurs when a blade is pinched or bound by a workpiece. This can result in the work being thrown out of the radial saw in the direction of a user causing personal injury. Wrong way feed is an attempt to feed the workpiece into the outfeed side of the blade. Rotational force can pull the workpiece into the blade if the workpiece is fed in the same direction as the blade rotates. As a result, hands and fingers could be pulled along with the workpiece into the spinning blade before the user can let go or pull back. Not only can fingers, hand or an arm be cut off, but a propelled workpiece could injure a bystander.

Cross cutting safety hazards include exposed blade teeth, rolling carriage and thrown workpiece. During cross cutting, blade teeth can be exposed which if contacted can result in potential damage to the fingers, hand or arm of a user. Rolling carriage hazard occurs when the spinning blade inadvertently touches a workpiece or is lowered into the table causing the blade to suddenly come forward. This creates a risk to the user whose hands may be in the path of the blade. Finally, thrown workpiece hazard occurs when a workpiece is picked up by a spinning blade and thrown. A user or bystander could be hit by the thrown workpiece.

As will be understood from the discussion that follows, the present invention employs numerous safety and operational features in a radial saw which overcome many of the rip cutting and cross cutting hazards to which a user can be exposed through improper operation of the saw. As a result, the difference of the present invention from prior art designs will be readily apparent to those skilled in the art.

SUMMARY OF THE INVENTION

Among the several objects and advantages of the present invention include:

The provision of a radial saw with new and improved rip cutting and cross cutting safety and operational features;

The provision of the aforementioned radial saw having a lower movable blade guard that is configured to protect a user against contact with a motor driven saw blade associated with the radial saw;

The provision of the aforementioned radial saw in which a lower blade guard includes a wrong way feed barrier during rip cutting;

The provision of the aforementioned radial saw which includes an infeed design that facilitates automatic upward and downward movement of the lower blade guard relative to a fixed upper blade guard during rip cutting;

The provision of the aforementioned radial saw in which a lower blade guard is configured to protect a user both against contact with the side of the motor driven blade and at a leading edge end of the motor driven saw blade when set up for cross cutting;

The provision of the aforementioned radial saw including an adjustable outfeed user barrier which is mounted to the upper blade guard for protecting the user during rip cutting, the adjustable outfeed user barrier also being capable of protecting the user from a leading edge of the motor driven saw blade during cross cutting;

The provision of the aforementioned radial saw including manually operated means to raise the lower blade guard at the start of cross cutting including a hand operated trigger which must be actuated to raise the lower blade guard;

The provision of other specific safety guards and barriers incorporated in the radial saw of the present invention to protect the user against injury or damage during rip cutting and cross cutting; and The provision of the aforementioned radial saw with improved safety features that are either passive or simple to operate active safety features; are reliable and durable in operation when properly used, and incorporate easy to understand user friendly designs that are well adapted for the purposes intended.

Briefly stated, the present invention discloses a radial saw with blade guards and barriers to enhance the safety of rip cutting and cross cutting of workpieces. The radial saw includes a motor driven saw blade mounted on a supporting arm that overhangs a worktable, the motor driven saw blade being movable relative to a worktable mounted fence to enable the motor driven saw blade to be operated for rip cutting of workpieces longitudinally along the length of the fence and for cross cutting a workpiece transverse to the fence. An upper blade guard is mounted in fixed position relative to a motor supported by a yoke that depends from the supporting arm, the upper blade guard covering approximately an upper half of the motor driven saw blade. A lower blade guard depends from the upper blade guard and substantially covers approximately the lower half of the motor driven saw blade when resting on the worktable. The lower blade guard is mounted to the upper blade guard for automatic upward and downward movement relative to the upper blade guard when resting upon workpieces of different thickness to protect a user against contact with the motor driven saw blade. The lower blade guard includes a wrong way feed barrier during rip cutting.

The wrong way feed barrier of the lower blade guard includes a blunt transverse wall in the lower blade guard along an outfeed end that extends a short distance above the worktable when the lower blade guard rests on the worktable. The blunt transverse wall cooperates with the mounting of the lower blade guard to the upper blade guard to provide the wrong way feed barrier during rip cutting. Specifically, link arms are pivotally attached at an angle to the upper and lower blade guards, with the angle of the link arms cooperating with the blunt transverse wall to prevent workpiece entry from the outfeed end of the lower blade guard during rip cutting. The blunt transverse wall serves as a backup to a riving knife and anti-kickback pawls, that function as adjustable outfeed user barrier means, when set in position, as explained below.

The lower blade guard, along an infeed end, has a curved shape which cooperates with the angle of the link arms extending between the upper and lower blade guards to facilitate automatic upward and downward movement of the lower blade guard relative to the upper blade guard.

The lower blade guard is configured to protect a user against contact with the side of the motor driven blade saw and at a leading edge of the motor driven saw blade when set up for cross cutting. The lower blade guard includes means to raise the guard at the start of cross cutting. Such means include hand operated trigger means connected to the lower blade guard for raising same. The lower blade guard is pivotally and slidably mounted to the upper blade guard for relative upward and downward movement. The link arms are pivotally attached to both the upper and lower blade guards on opposite sides thereof. One of the link arms is also interconnected to a slidable link arm mounted to the upper blade guard. The slidable link arm is part of a pull link that includes a slot at one end for slidably engaging a cam follower fixed to the upper blade guard and a transversely extending pull section at an opposite end of the pull link. The pull link moves the link arms to cause the lower blade guard to move upwardly relative to the upper blade guard when the pull section is engaged to operate the pull link in a particular direction. The pull section of the pull link is engaged by a hand operated trigger mechanism that is operably associated with a handle for moving the motor driven saw blade. The hand operated trigger mechanism is operable for lifting the blade guard up and over the rip fence prior to cross cutting of the workpiece. The pull link also includes an independent lift tab on an opposite end from the pull section for manually engaging and lifting the lower blade guard relative to the upper blade guard, if desired.

An independent partial lower guard may be also mounted on one side of the lower blade guard. One end of the independent partial lower guard is pivotally mounted on the upper blade guard while a second end is slidably mounted on the lower blade guard. The independent partial lower guard is configured to rest upon a workpiece supported by the worktable and is constructed to automatically lift the lower blade guard by a workpiece at the infeed end of the motor driven saw blade during rip cutting. The independent partial lower guard is also configured to be lifted by the lower guard when the lower guard is lifted for cross cutting.

Adjustable outfeed user barrier means are mounted to the upper blade guard for protecting the user during rip cutting. Such adjustable outfeed user barrier means is also capable of protecting the user from a leading edge of the motor driven saw blade during cross cutting. The adjustable outfeed user barrier means includes a riving knife for positionment within a workpiece kerf behind the motor driven saw blade during rip cutting. The adjustable riving knife is capable of being lowered a short distance above a workpiece surface to partially block contact at a leading edge of the motor driven saw blade during cross cutting. The adjustable riving knife also includes an elongated slot which cooperates with the fastener extending therethrough that is mounted to the upper blade guard for adjustably positioning the riving knife in the workpiece kerf behind the motor driven saw blade during rip cutting.

The adjustable outfeed user barrier means further includes adjustable anti-kickback pawls for engaging the workpiece on both sides of the workpiece kerf behind the motor driven saw blade during rip cutting. The adjustable kickback pawls are mounted to a pawl supporting bracket, which is substantially complementary configured similar to the riving knife. The pawl supporting bracket is slidably mounted relative to the riving knife and includes an elongated slot complementary configured to the elongated slot of the riving knife. A fastener extends through both of the elongated slots of the riving knife and pawl supporting bracket for adjustably and independently positioning the riving knife and anti-kickback pawls to accommodate workpieces of different thicknesses.

The radial saw further includes adjustable hold down means to hold a workpiece close to the worktable at the infeed of the motor driven saw blade during rip cutting. The adjustable hold down means includes an elongated slot which cooperates with the fastener extending therethrough that is mounted to the upper blade guard for adjustably positioning the hold down in a fixed position just above the workpiece during rip cutting.

The lower blade guard adjacent the riving knife and anti-kickback pawls includes notches formed to the lower end of a transverse wall to assist in clearing corners of workpieces during bevel rip cuts near an edge of the workpiece.

The upper blade guard also includes an exhaust port for the removal of saw dust. The adjustable hold down means is configured to direct saw dust into the upper blade guard toward the saw dust export port.

Preferably, the lower blade guard is formed from transparent plastic material to permit viewing the operation of the motor driven saw blade to further assist a user in the safety and operational features of the present invention.

These and other objects and advantages of the present invention will become apparent from the description that follows.

BRIEF DESCRIPTION OF THE DRAWINGS

In the drawings.

FIG. 14 is a side elevational view of the radial saw assembly and illustrating the manner in which the independent partial lower guard works in conjunction with the lower blade guard and upper blade guard in moving the lower blade guard upwardly relative to the upper blade guard when the independent partial lower guard contacts a workpiece;

FIG. 15 is an end elevational view of the radial saw assembly as viewed from the outfeed side of the radial saw during a rip cutting operation; and FIG. 16 is an end elevational view of the radial saw assembly as viewed along an infeed side of the radial saw during a rip cutting operation.

Corresponding reference numerals will be used throughout the various figures of the drawings.

DESCRIPTION OF THE PREFERRED EMBODIMENT

The following detailed description illustrates the invention by way of example and not by way of limitation. This description will clearly enable one skilled in the art to make and use the invention, and describes several embodiments, adaptions, variations, alternatives and uses of the invention, including what I presently believe is the best mode of carrying out the invention.

Figure 1:
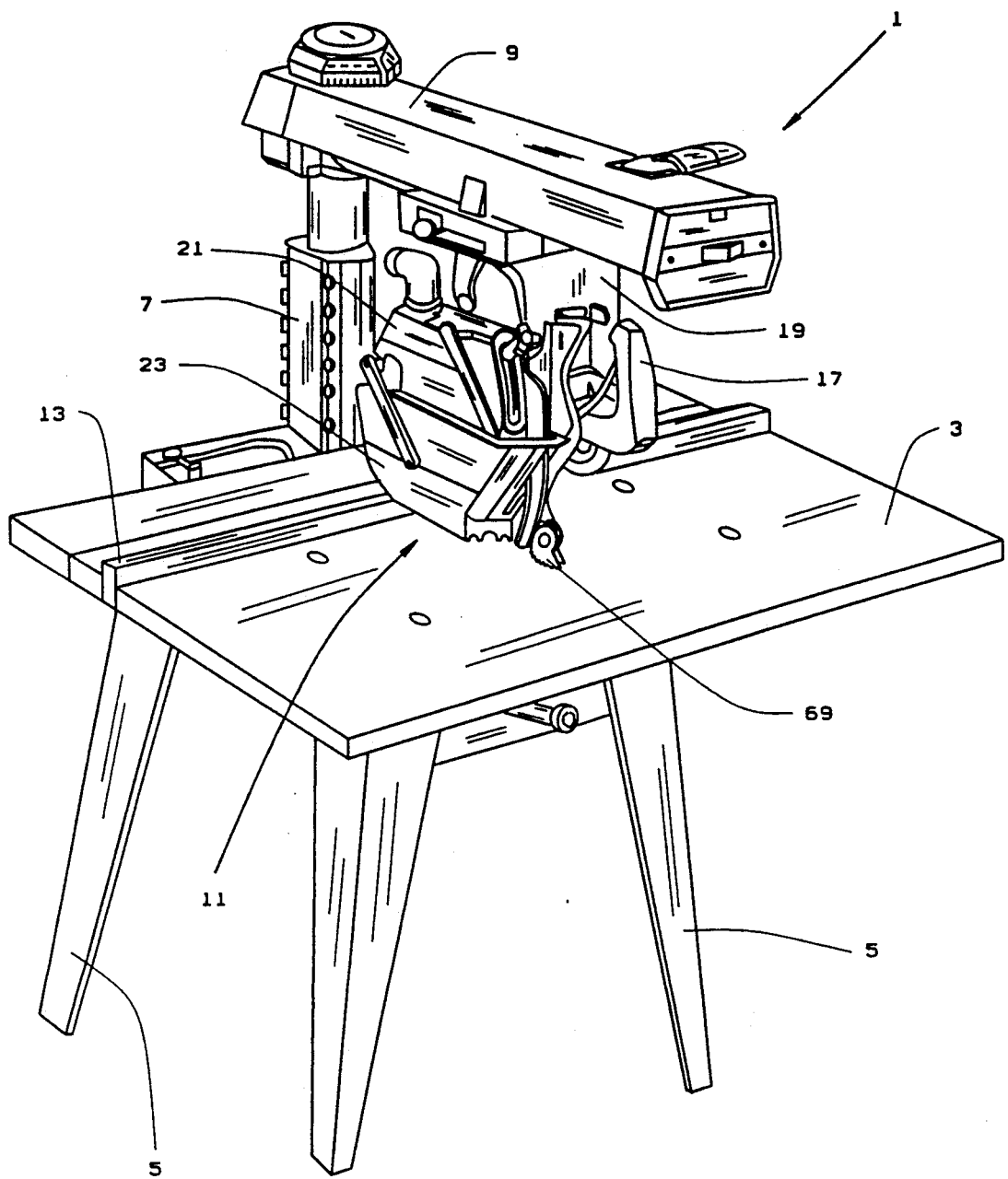
FIG. 1 is an enlarged perspective view of a radial saw employing safety guards and barriers which are constructed in accordance with the teachings of the present invention.

The radial saw 1 illustrated in the drawings includes a horizontally extending worktable 3 which is supported by a plurality of legs 5, as is well known. Extending upwardly from one side of the worktable 3 is a base or column 7 which mounts a supporting arm 9, that supports a rotatably mounted yoke 19, for moving the radial saw assembly 11 into rip cutting or cross cutting relationship relative to a worktable mounted fence 13. The worktable supported fence 13 can be mounted in the front fence position illustrated in FIG. 1, in a rear fence position (not shown) where the worktable mounted fence 13 is located adjacent the base or column 7 at one edge of the worktable 3 or in a third position between the front and rear positions where the fence 13 is positioned between the rear most and a second of the three sections, shown in the worktable 3 in the drawings.

Figure 2:
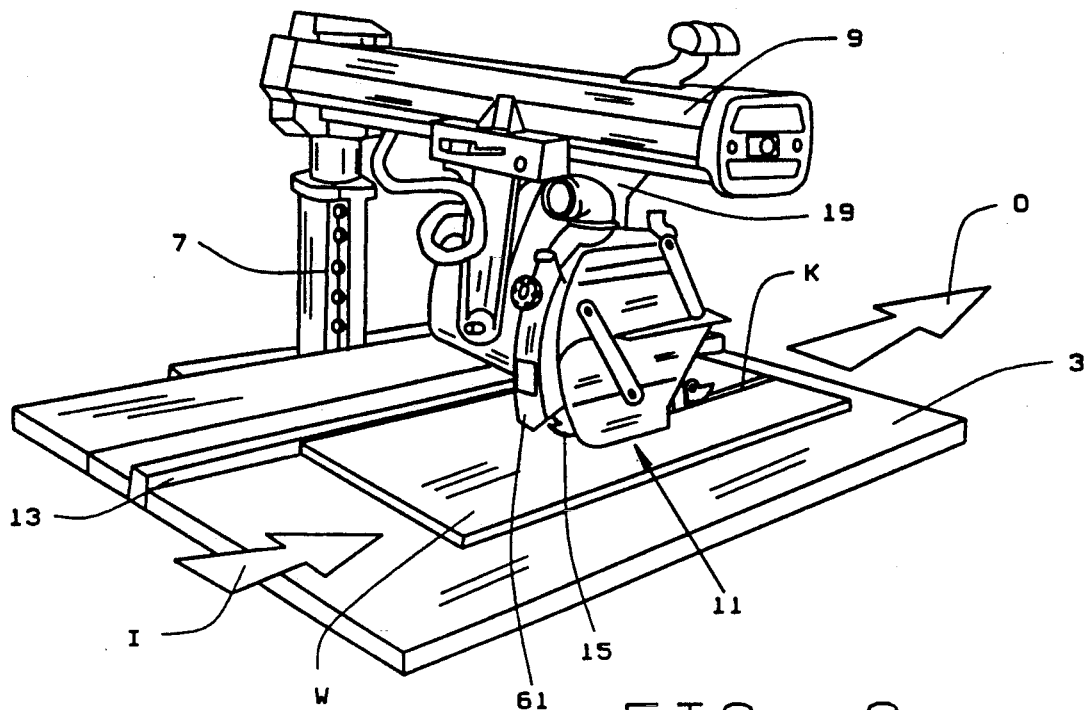
FIG. 2 is a slightly reduced in size perspective view of the radial saw shown in FIG. 1 when viewed along an infeed side in a rip cutting operation.
Figure 3:
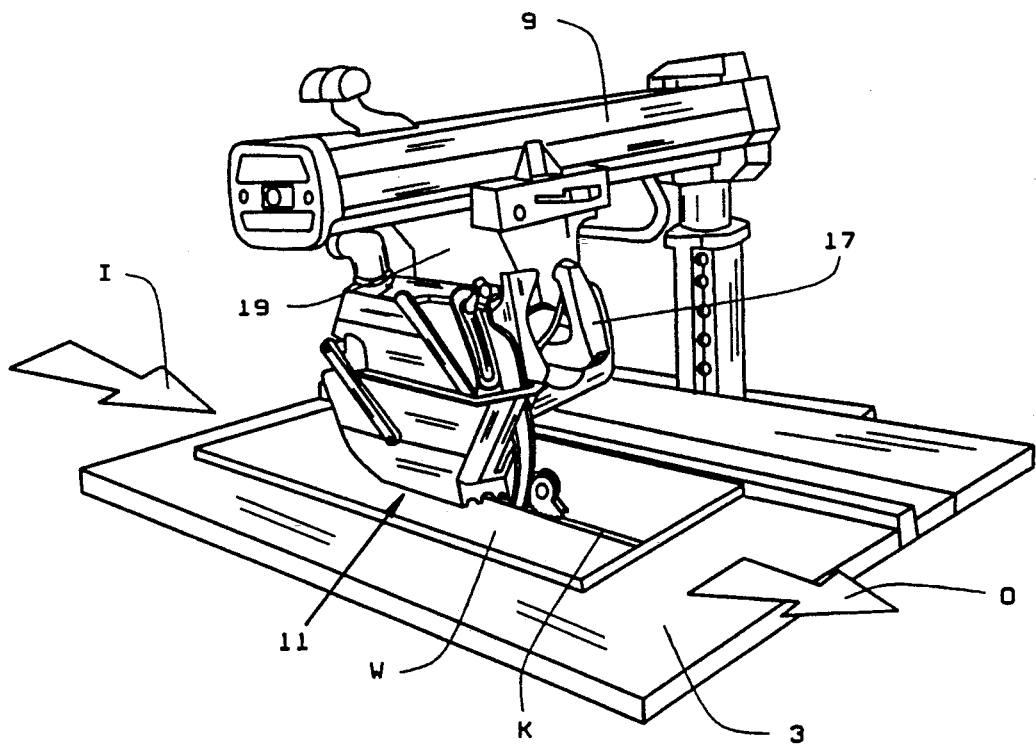
FIG. 3 is also a similar reduced in size perspective view of the radial saw of FIG. 1 as viewed on an outfeed side in a rip cutting operation.

When it is desired to operate the radial saw assembly 11 for reducing the width of a workpiece by cutting along its length, the radial saw assembly 11 is positioned relative to the worktable mounted fence as shown in FIGS. 2 and 3 of the drawings to enable a motor driven saw blade 15 (see FIGS. 2 and 9) to rip cut workpieces longitudinally along the length of the worktable mounted fence 13. Alternatively, when operated in a cross cutting operation, the radial saw assembly 11 is positioned, as illustrated in FIGS. 4–5 of the drawings, to enable the motor driven saw blade 15 to cross cut workpieces transverse to the fence, for cutting a workpiece to length.

Figure 4:
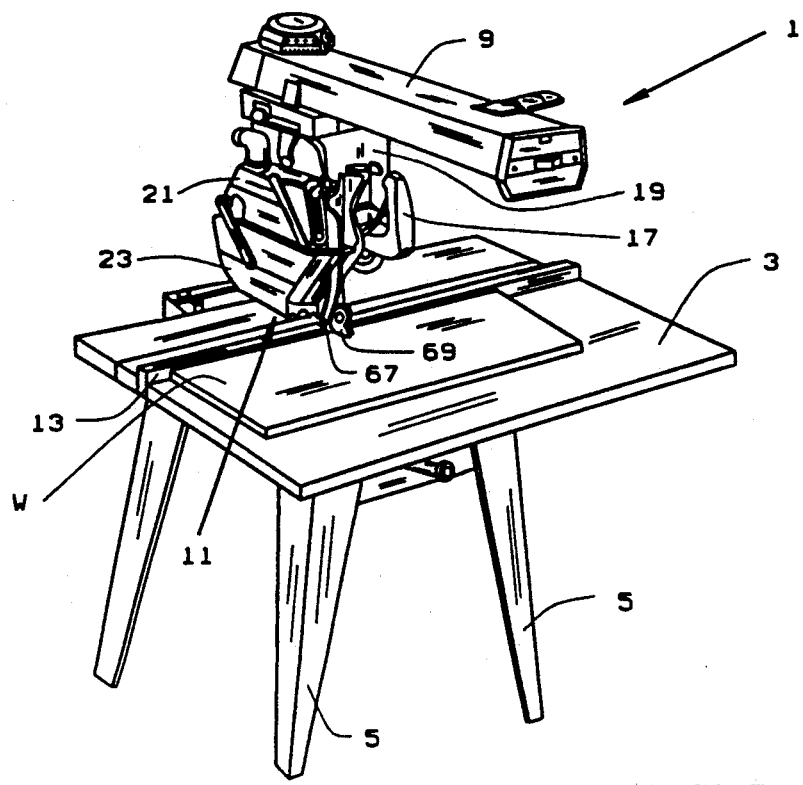
FIG. 4 is a similar reduced size perspective view of the radial saw in FIG. 1, just prior to operating same in a cross cutting operation.
Figure 5:
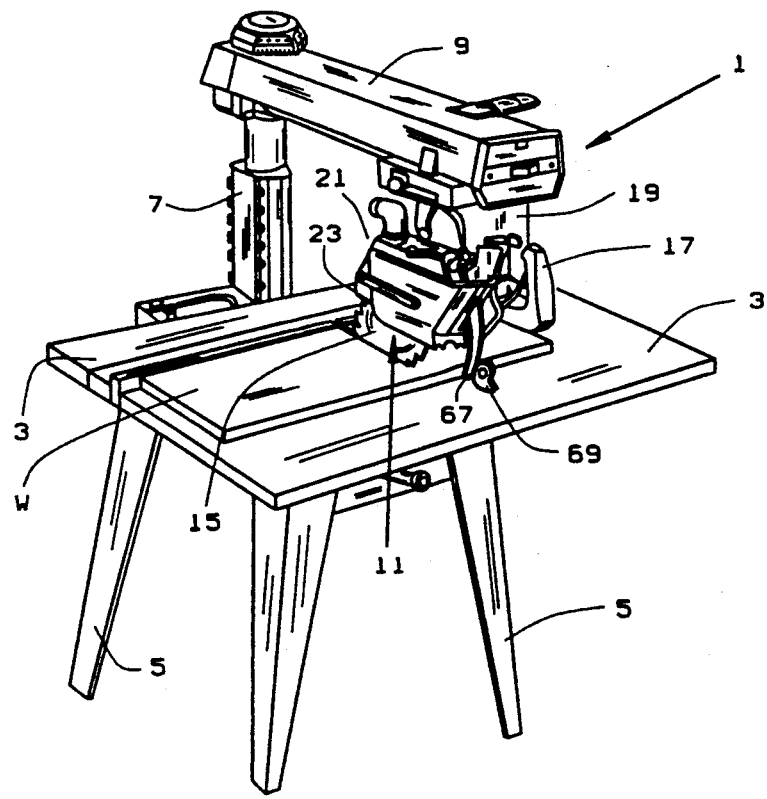
FIG. 5 is also a similar reduced in size perspective view of the radial saw shown in FIG. 1 when operated in a cross cutting operation.
Figure 6:
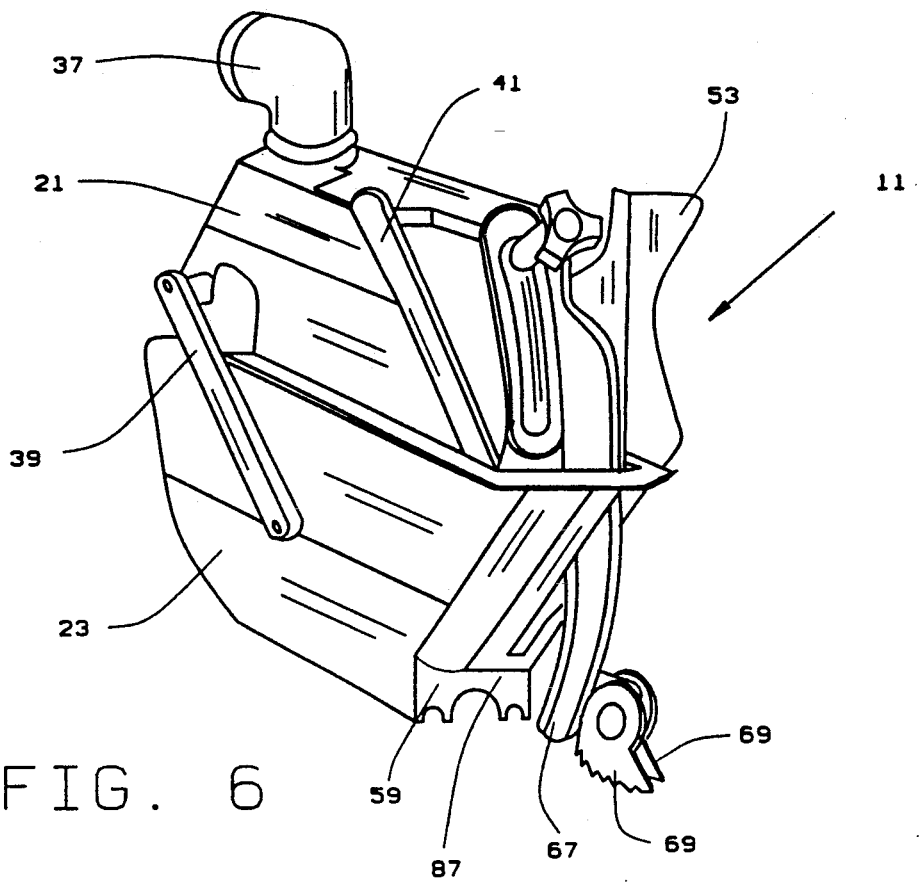
FIG. 6 is an enlarged perspective view of the radial saw assembly including safety guards and barriers, as viewed from an outfeed side during a rip cutting operation.
Figure 7:
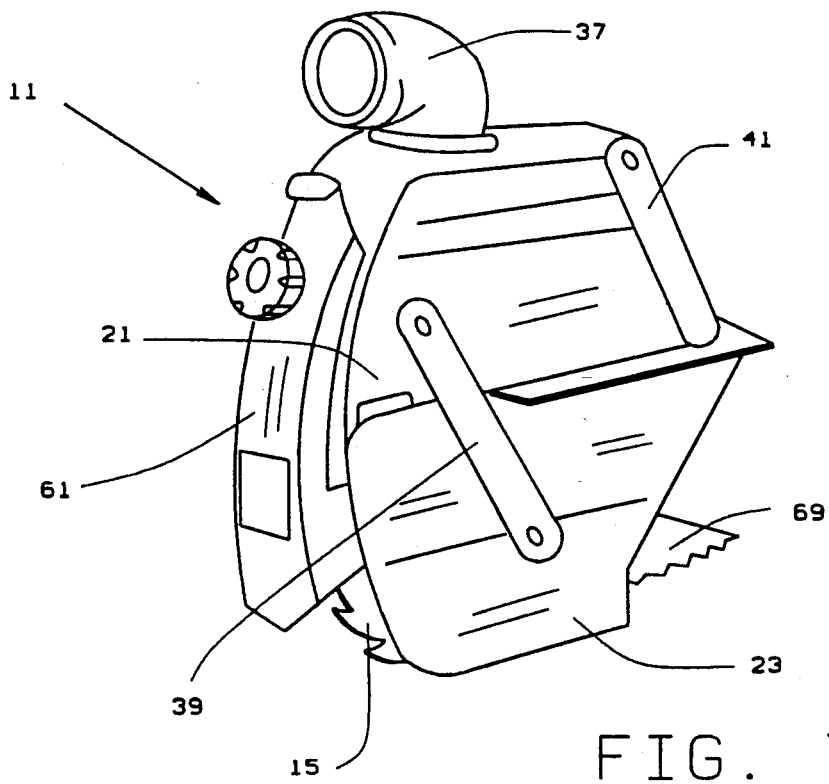
FIG. 7 is an enlarged perspective view of the radial saw assembly including safety guards and barriers, as viewed from the infeed side of the radial saw during a rip cutting operation.

In order to understand the safety guards and barriers as used in the radial saw assembly 11, attention is first directed to FIGS. 2–3 for a general description of rip cutting operations, and to FIGS. 4–5 for a general description of cross cutting operations.

As shown in FIGS. 2–3 of the drawings, rip cutting involves changing the width of a workpiece by cutting along its length. As shown in FIG. 2, the workpiece W is fed along the infeed side I into the radial saw assembly 11, which is mounted in a fixed position relative to the supporting arm 9 for rip cutting workpieces longitudinally along the length of the worktable rip fence 13. The workpiece W is fed into the motor driven saw blade 15, which rotates in a fixed position parallel to the worktable rip fence 13 and at a set distance from the rip fence 13. Thus, the rip fence 13 serves as a guide for the workpiece W to be cut. On the outfeed side 0, a workpiece kerf K is formed behind the motor driven saw blade 15 as will be explained in detail below. Suitable outfeed user barrier means are employed to extend within and on both sides of the workpiece kerf K for the safety and enhanced operation of the radial saw assembly 11 and included motor driven saw blade 15, as will be explained further below.

Note in FIG. 3 of the drawings that the radial saw assembly 11 including the motor driven saw blade 15, cuts the workpiece W to a proper width, while forming the workpiece kerf K on the outfeed side of the radial saw assembly 11. As will be discussed in greater detail below, suitable blade guards and user barriers are employed to prevent a user from feeding a workpiece W to the radial saw assembly 11 from the outfeed side 0. This is particularly important in order to avoid outfeed zone hazards, kickback and wrongway feeding hazards, as explained in the background of the invention.

Reference to FIGS. 4–5 of the drawings illustrates cross cutting operations. Prior to the start of the cross cutting operation, the lower movable blade guard 23 must be moved upwardly and over the worktable fence 13 from the position illustrated in FIG. 4 to the position illustrated in FIG. 5 of the drawings. For this purpose, a hand operated trigger mechanism (see FIGS. 12–13) is associated with a handle 17 that is pulled by the user, to move the radial saw assembly 11 through the workpiece W to make the complete cut. This will be explained in substantial detail in the discussion that is to follow. Also to be explained will be the manner in which the outfeed user barrier, in a rip cutting operation, is also used to protect the user at the leading edge of the motor driven saw blade 15 in the cross cutting operation, as illustrated in FIG. 5.

Referring now to the specific radial saw guards and barriers used with the radial saw 1 of the present invention, attention is primarily focused on FIGS. 6–16 of the drawings which show the various components of the radial saw assembly 11 that are used to provide the safety and operational features for the radial saw 1.

The radial saw assembly 11, including a motor (not shown), is mounted to a yoke 19, the yoke 19 being supported by and rotatably and slidably mounted to the supporting arm 9, as is well known. In cross cutting operations as shown in FIGS. 4–5 of the drawings, the yoke 19, including the radial saw assembly 11, is moved by the handle 17 along a rail (not shown) on the bottom surface of the supporting arm, as is common. Thus, in cross cutting operations, the yoke 19 including the radial saw assembly 11 is slidably moved longitudinally along the length of the supporting arm 9 in cutting workpieces to the desired length. For rip cutting operations, the radial saw assembly 11 is moved from the position shown in FIGS. 4–5 to the position illustrated in FIGS. 2-3 where the radial saw assembly 11 extends transverse to the supporting arm 9, and generally parallel relationship to the fence 13. This is accomplished by rotating the yoke 19 relative to the supporting arm 9, through a typical rotatable yoke mounting (not shown), for positioning the radial saw assembly 11 in a transverse relationship to the supporting arm 9 as shown in FIGS. 2-3 of the drawings in order to rip cut a workpieces to the desired width. The transverse relationship of the radial saw assembly 11 illustrated in FIGS. 2-3 of the drawings shows an "out-rip" set-up, that is, with radial saw assembly 11 positioned out away from the fence 13; however, it is to be understood that an "in-rip" set-up (not shown) is also possible, where the radial saw assembly 11 is positioned in toward the fence 7.

One way in which the yoke 19 is rotatably and slidably mounted to the supporting arm 9 can best be understood by reference to copending application Ser. No. 08/031,345, filed Mar. 15, 1993 entitled RADIAL ARM SAW GUARD WITH OPERATIONAL INTERLOCK. There are, of course, a number of ways in which the yoke 19 can be rotatably and slidably mounted to the supporting arm 9, all of which are within the purview of the present invention, but none of which are specifically important in understanding the features of the present invention. The aforementioned patent application also discloses how a motor is supported by the yoke, in order to enable the motor driven saw blade to be mounted to the motor, along with an upper fixed blade guard, described below.

The radial saw assembly 11 includes an upper fixed blade guard 21 and a lower movable blade guard 23, both of which are configured as illustrated in the drawings to be positioned over the motor driven saw blade 15 for protecting a user during rip cutting and cross cutting operations. Note in FIGS. 11-13 of the drawings that the upper blade guard 21 includes a guard clamp screw 25 which is threadably associated relative to a nut 27 that is captured by a nut retaining cage 29. The lower end 31 of the guard clamp screw 25 engages a clamp pawl 33 that is pivotally mounted to the upper blade guard 21 at 35 for securing the upper blade guard 21 to the motor (not shown). As shown in each of FIGS. 11-14, the clamp pawl 33 is designed to engage an outer flange (not shown) of the motor (not shown) when the clamp screw 25 is threaded downwardly to cause its lower end 31 to move the clamp pawl 33 into clamping engagement with the outer flange (not shown) surrounding the driven shaft of the motor (not shown). In addition, a notch X in the upper blade guard 21 engages a key (not shown) of the motor (not shown) to prevent rotation of the upper guard 21 around the outer flange (not shown) of the motor. As a result, the upper blade guard 21 is mounted in fixed relationship to the motor (not shown), the motor itself being mounted to the yoke assembly 19.

The upper blade guard 21, when mounted in fixed position relative to the motor (not shown), covers approximately an upper half of the motor driven saw blade 15. The upper blade guard 21 includes an exhaust port 37 for the removal of sawdust, since the upper fixed blade guard 21 and the lower movable blade guard 23 essentially surround the motor driven saw blade 15 during rip cutting and cross cutting operations. By covering the approximate upper half of the motor driven saw blade 15, the upper blade guard 21 has several important functions. These include preventing hand contact with the upper half of the motor driven saw blade 15, while containing sawdust to enable it to be directed out of the sawdust outlet 37. The upper blade guard 21 also provides a mounting means to secure the lower blade guard 23 and the other barrier components, to be subsequently described, to the radial saw assembly 11.

Figure 8:
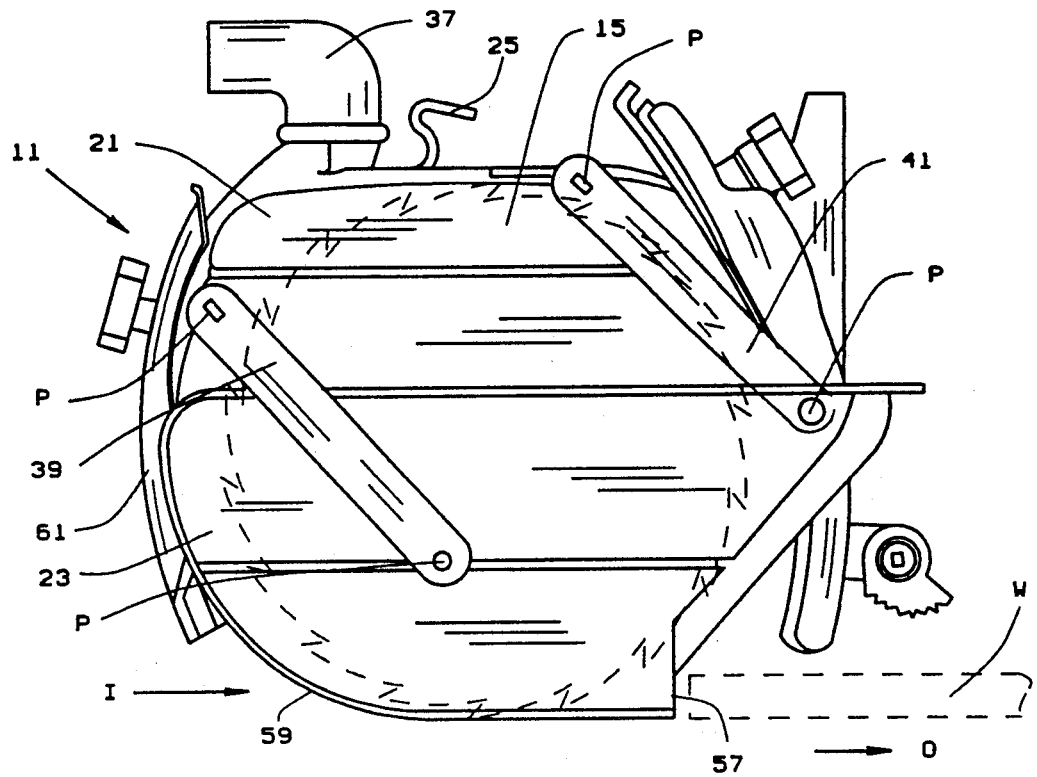
FIG. 8 is an enlarged side elevational view of the radial saw assembly including safety guards and barriers and particularly illustrating the wrong way feed barrier.
Figure 9:
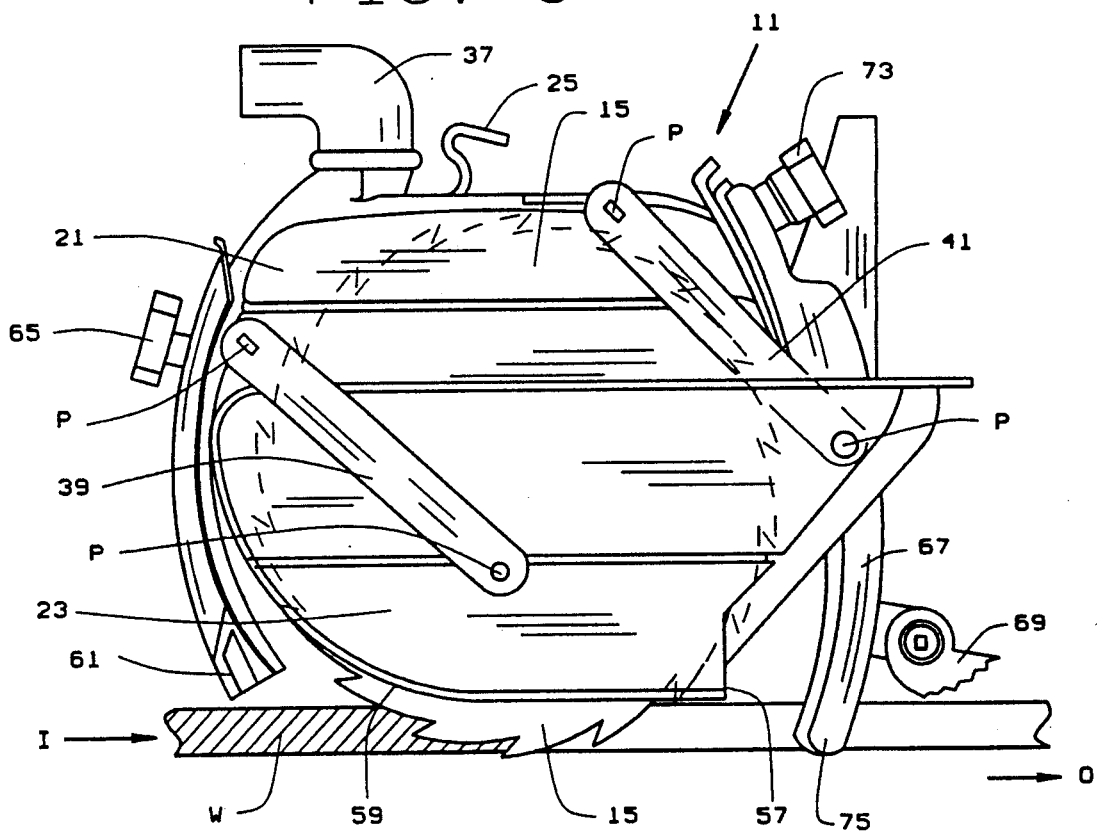
FIG. 9 is a side elevational view of the radial saw with safety guards and barriers and particularly illustrating the manner in which an adjustable hold down, riving knife and anti-kickback pawls are used in the present invention during rip cuts.
Figure 10:
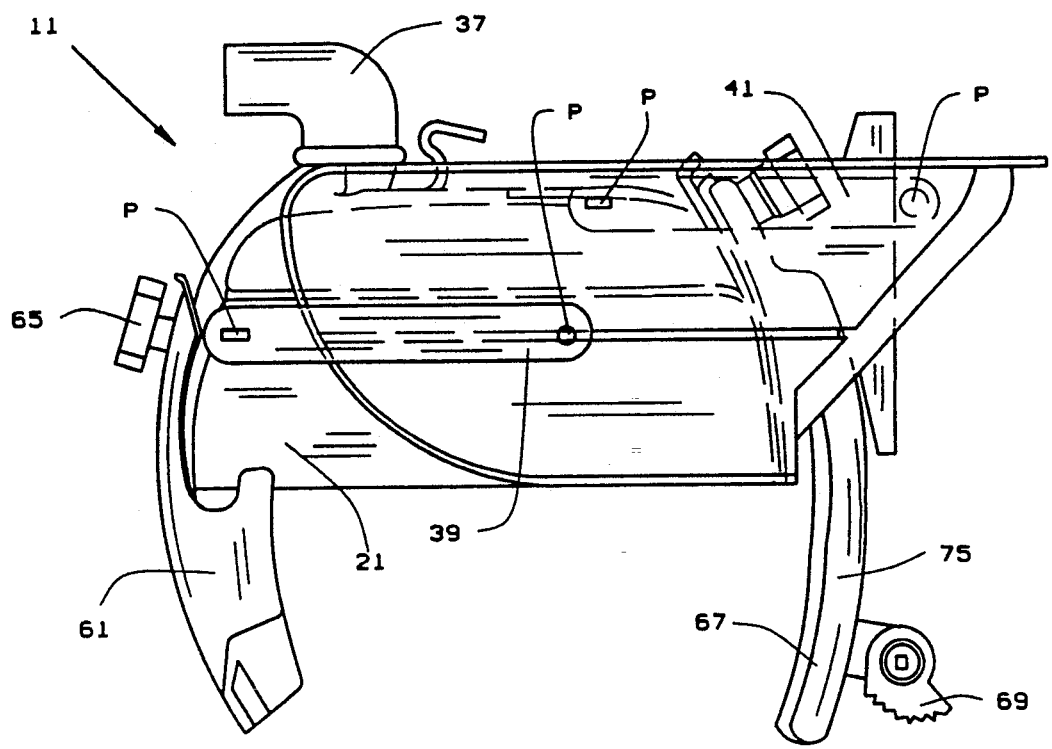
FIG. 10 is a side elevational view of the radial saw assembly and particularly illustrating the manner in which the lower guard is capable of being moved to an uppermost position relative to a fixed upper blade guard.
Figure 11:
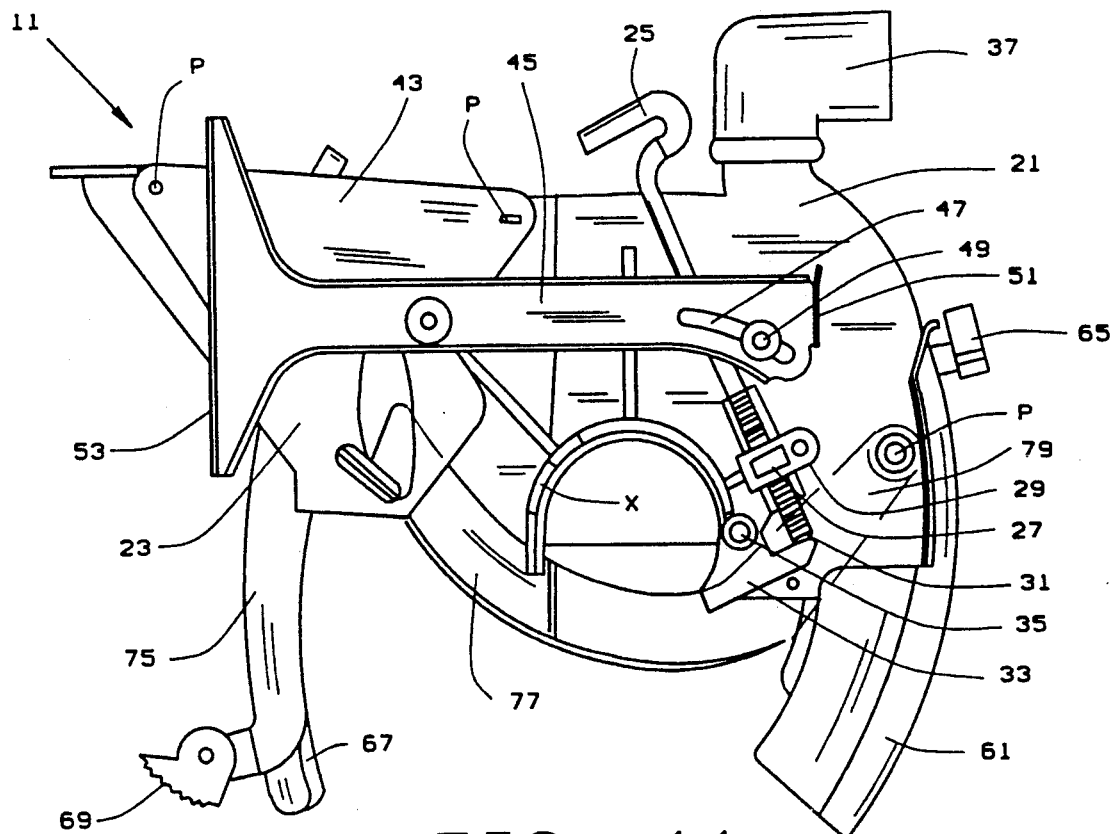
FIG. 11 is a side elevational view of the radial saw assembly on the opposite side thereof from that illustrated in FIG. 10.

Specifically, the lower blade guard 23 depends from the upper blade guard 21 for substantially covering approximately the lower half of the motor driven saw blade 15 when the lower blade guard 23 rests upon the worktable 3. The lower blade guard 23 is also mounted to the upper blade guard 21 for automatic upward and downward movement relative the upper blade guard when resting upon workpieces of different thickness, in order to protect a user against contact with the motor driven saw blade. For this purpose, the lower blade guard 23 is pivotally and slidably mounted to the upper blade guard 21 for relative upward and downward movement. In this connection, link arms 39 and 41 on one side of the upper and lower blade guards 21, 23 as shown in FIGS. 8-9 of the drawings, and link arm 43 of a different shape and configuration shown in FIGS. 11-14, on an opposite side of the upper and lower blade guard 21, 23, serve to permit the upward and downward movement of the lower blade guard 23 relative to the upper blade guard 21. In addition, link arms 41 and 43 are connected by a common shaft (not shown) which extends through the upper blade guard 21 at their upper pivot point P. This forces link arms 41 and 43 to rotate together about their upper pivot point P to assure the movement of the lower blade guard 23 upward in a plane generally parallel to the saw blade 15.

The link arms 39 and 41 are pivotally mounted at spaced pivot points P on one side of the upper and lower blade guards 21, 23 and extend at an angle so as to facilitate movement of the lower blade guard 23 from an infeed side, while restricting movement of the lower blade guard 23 relative to the upper blade guard 21 from an outfeed side. This is important in preventing wrong way feeding, as will be subsequently discussed.

Figure 12:
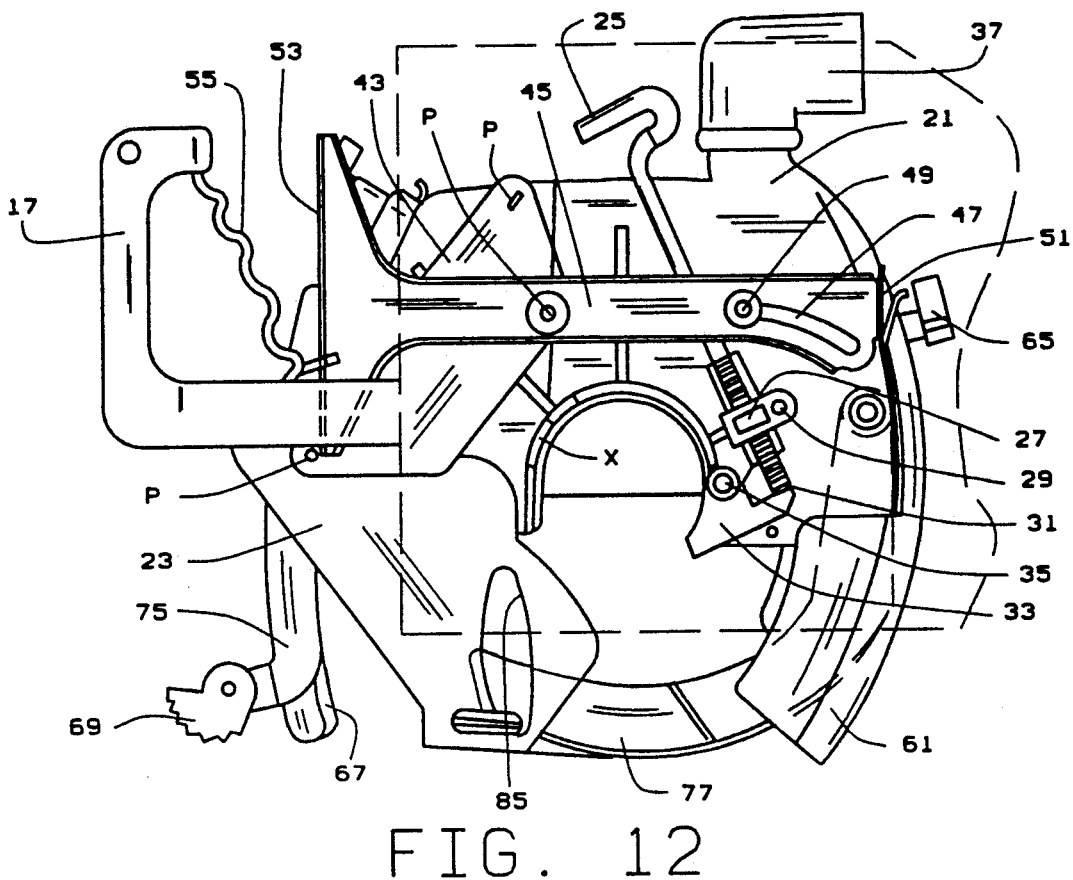
FIG. 12 is a side elevational view of the radial saw assembly in conjunction with a hand operated trigger mechanism which is used for lifting the lower blade guard, including independent partial lower guard, at the start of cross cutting in order to clear the rip fence.
Figure 13:
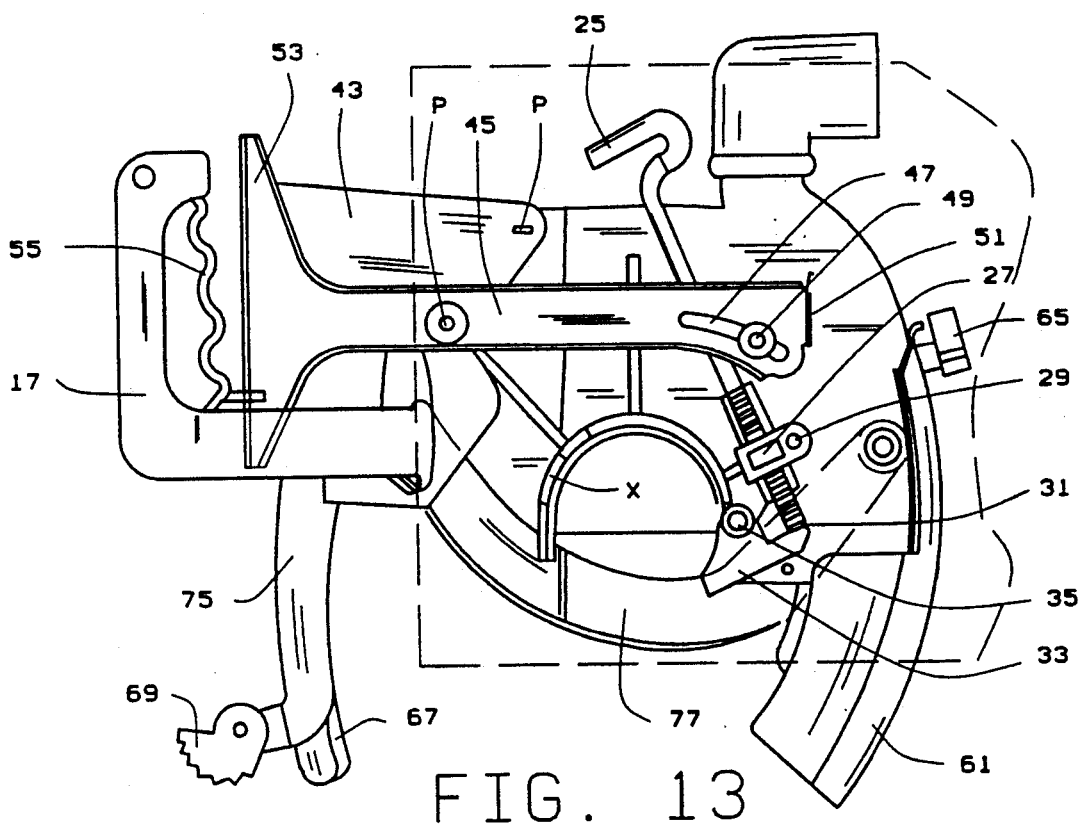
FIG. 13 is a side elevational view of the radial saw assembly shown in FIG. 12 and illustrating the manner in which the lower blade guard and the independent partial lower guard are moved upwardly relative to the fixed upper guard by the associated trigger mechanism and pull link connected to the upper blade guard and lower blade guard.

As illustrated in FIGS. 11-14 of the drawings, the trapezoidal shaped link arm 43 is also interconnected to a slidable link arm 45 that is mounted to the upper blade guard 21. The trapezoidal shaped link arm 43 is pivotally mounted at pivot point P to the upper blade guard 21, while the slidable link arm 45 is pivotally mounted at a single pivot point P to the link arm 43. At the same time, the slidable link arm 45 is provided with an elongated arcuate slot 47 that slidably engages a cam follower 49 fixed to the upper blade guard 21. At an end adjacent the arcuate slot 47 is an independent lift tab 51 for manually engaging the link arm 45, in order to move same along the arcuate slot 47 for raising the lower blade guard 23. At the left hand side of the link arm 45 is a transversely extending pull section 53 which is engaged by a hand operated trigger mechanism 55 that is operably associated with the handle 17. Specifically, the trigger mechanism 55 has one end connected to the pull section 53, while an opposite end is connected to the handle 17, as best seen in FIGS. 12-13 of the drawings. For cross cutting operations, the trigger mechanism 55 is engaged and depressed from the position shown in FIG. 12 to that shown in FIG. 13 for lifting the lower blade guard 23 relative to the upper blade guard 21.

Thus, whether the independent lift tab 51 is engaged or the trigger mechanism 55 is depressed to engage the pull section 53, the result is that the link arm 45 is moved from the position shown in FIG. 12 to that illustrated in FIG. 13. As will be appreciated, the slidable link arm 45, through its arcuate slot 47, moves relative to the cam follower 49 at one end, while the slidable link arm 45 pivots at single pivot point P relative to the trapezoidal shaped link arm 45. Since the link arms 39, 41 and 43, on opposite sides of the upper and lower blade guards 21, 23, are pivotally mounted to the blade guards 21, 23, the movement of the slidable link arm 45 to the left causes the trapezoidal shape link arm 43 to be moved from the position shown in FIG. 12 to that illustrated in FIG. 13. When this occurs, the lower blade guard 23 is moved upwardly relative to the upper blade guard 21 for clearing the fence 13, at the start of cross cutting, as will be explained further below.

In order to understand the various safety and operational features that are incorporated in the radial saw assembly 11 of the present invention, a discussion will be first directed to those features employed during rip cutting operations, and then those features that are used in cross cutting operations. In rip cutting, the lower blade guard 23 is provided with a wrong way feed barrier in the form of a blunt transverse wall 57 (see FIG. 8). The blunt transverse wall 57 cooperates with the link arms 39, 41 and 43 to prevent workpiece entry from the outfeed end of the lower blade guard 23 during rip cutting. Thus, as shown in FIG. 8 of the drawings, it is impossible for a user to insert a workpiece W into the radial saw assembly 11 since the blunt transverse wall 57, cooperating with the link arm 39, 41 and 43, prevents workpiece entry into the radial saw assembly 11 from the outfeed end 0 of the lower blade guard 23 during rip cutting. As will be appreciated, the angled link arms 39, 41 and the trapezoidal shape link arm 43 prevent the raising of the lower blade guard 23 from an outfeed side 0 since any force applied against the blunt transverse wall 57 will be met by an opposing force applied through the link arms 39, 41 and 43. This is a back-up or secondary line of defense against wrong way feeding because the workpiece could not reach the lower guard if the riving knife and anti-kickback pawls are properly positioned as instructed in FIG. 9 of the drawings.

Along an infeed end 59 of the lower blade guard 23, the lower blade guard 23 has a curved shape which cooperates with the angle of the link arm 39, 41 and 43 to facilitate automatic upward and downward movement of the lower blade guard 23 relative to the upper blade guard 21. Thus, as a workpiece is properly inserted into the infeed end I of the radial saw assembly 11 (as shown in FIG. 9 of the drawings), the lower blade guard 23 will automatically move upwardly relative to the fixed upper blade guard 21, allowing the lower blade guard to rest upon workpieces of different thickness, while protecting a user against contact with the motor driven saw blade 15. The lower blade guard is arranged to automatically move upwardly and downwardly relative to the upper fixed blade guard by riding on the surface of the workpiece W during rip cuts. It is also capable of being lifted up and over the fence 13 and workpiece W by the trigger mechanism 55 during cross cutting operations. As a result, the lower blade guard 23 has several important functions. It partially blocks hand contact with the outfeed side 0 of the motor driven saw blade 15 during rip cuts. With the transverse blunt wall 57 and the angled link arms 39, 41 and 43, the lower blade guard 23 helps prevent wrong way feeding during rip cutting operations. The lower blade guard 23 also partially blocks careless hand contact with the motor driven saw blade 15 from the front of the lower blade guard 23, the side opposite the motor (not shown), and the side adjacent the motor (not shown). When used in conjunction with the optional independent partial lower guard 77, greater protection against careless hand contact is provided, as described below. The lower blade guard 23 further partially blocks contact with the motor driven saw blade 15 when lowered to the workpiece surface during cross cutting operations. It also prevents carriage and blade roll past the fence 13 when set up for cross cuts, where the fence 13 is in front of the lower blade guard 23. Finally, it helps to contain sawdust and workpiece fragments.

It will be noted that there are a series of notches 87 at the lower edge of the blunt transverse wall 59 (see FIGS. 6 and 15-16) which enable corners of workpieces W to clear the lower bevel blade guard 23 during bevel rip cuts near the edge of the workpiece W. The lower blade guard 23 is also preferably formed from a transparent plastic material to facilitate viewing of the motor driven saw blade 15 by a user.

Additional safety and operational features extend from the upper blade guard 21 to facilitate rip cutting and cross cutting operations.

A hold down 61, complementary curved to the outer exterior of the upper blade guard 21, is employed for holding workpieces close to the worktable 3 at the infeed end I of the radial saw assembly 11 during rip cutting. The curvilinear shaped hold down 61 includes an elongated slot 63 (see FIG. 16) which cooperates with a thumb screw or fastener 65 that extends therethrough and is mounted to the upper blade guard 21 for adjustably positioning the hold down 61 in a fixed position just above a workpiece W during rip cutting. The purpose of the hold down 61 is to keep a workpiece W from raising off the surface of the worktable 3 on the infeed side I of the motor driven saw blade 15 during rip cuts. The hold down 61 also partially block hand contact with the infeed side I of the motor driven saw blade 15 during rip cuts. Additionally, the curved shape of the hold down 61 also assists in directing sawdust up into the fixed upper guard 21, toward the sawdust outlet 37.

In addition to the hold down 61, a riving knife 67 is arranged to follow in the workpiece kerf K behind the motor driven saw blade 15, while anti-kickback pawls 69, 69 are arranged to engage the workpiece W on opposite sides of the workpiece kerf K behind the motor driven saw blade 15 during rip cuts. The riving knife 61 has a generally curvilinear shape and is adjustably mounted relative to the upper blade guard 21. For this purpose, the adjustable riving knife 67 includes an elongated slot 71 (see FIG. 15) which cooperates with a thumb screw or fastener 73 extending therethrough for adjustably mounting same to the upper blade guard 21, in the same manner as the hold down 61. By moving the riving knife 67 downwardly, proper positionment of the lower end 75 of the riving knife 67 in the workpiece kerf K behind the motor driven saw blade 15 during rip cuts may be provided. The riving knife 67 is used during rip cutting and is conveniently raised for cross cuts. The purpose of the riving knife during rip cutting is to hold the workpiece kerf K open to prevent workpiece kickbacks, while helping guide the workpiece W. In addition, it prevents wrong way feeding during rip cuts, by extending directly within the path of a workpiece W attempted to be fed through the outfeed side O of the radial saw assembly 11. It also blocks hand contact with the outfeed side O of the motor driven saw blade 11 during rip cuts, by keeping a user's hand away from the motor driven saw blade 15. The riving knife 67 also partially blocks hand contact with the motor driven saw blade 15, when lowered to just above the workpiece surface, during cross cutting operations, as will be explained further.

The anti-kickback pawls 69, 69 are mounted to a pawl supporting bracket 75 that is complementary shaped and slidably mounted relative to the riving knife 67. The pawl supporting bracket 75 also includes a complementary shaped elongated slot 71 to enable the thumb screw or fastener 73 to extend through both elongated slots 71 in the riving knife 67 and the pawl supporting bracket 75 for adjustably and independently positioning the riving knife 67 and anti-kickback pawls 69, 69 so as to accommodate workpieces of different thickness. The anti-kickback pawls 69, 69 are arranged to follow on both sides of the workpiece kerf K behind the motor driven saw blade during rip cuts, but are conveniently raised for cross cutting operations. The anti-kickback pawls 69, 69 are adjusted to ride on the surface of the workpiece W during rip cutting operations. Specifically, the anti-kickback pawls 69, 69 have a number of important functions. They not only restrain the workpiece W in the event of a kickback, but partially block hand contact with the outfeed side O of the motor driven saw blade 15 during rip cutting. They also partially block hand contact with the motor driven saw blade 15 when lowered to just above the workpiece surface during cross cutting operations, as will be subsequently explained.

As best seen in FIG. 9 of the drawings, the radial saw assembly 11 is positioned with the lower blade guard 2 resting on the surface of the workpiece W. The adjustable hold down 61, at the front or infeed side I, has been lowered to hold the workpiece W close to the worktable 3 in the front or infeed side I of the motor driven saw blade 15 during rip cuts. On the outfeed side O, the riving knife 67 is positioned within the workpiece kerf K, while the anti-kickback pawls 69, 69 are arranged to follow on both sides of the workpiece kerf K behind the motor driven saw blade 15 during rip cuts.

Together with the wrong way feed barrier in the form of the transverse blunt wall 59 on the lower blade guard 23, the relative upward movement of the lower blade guard 23, while resting on a workpiece to accommodate workpieces of different thickness, and the adjustable hold down 61, the riving knife 67 and the anti-kickback pawls 69, 69, function to eliminate or substantially minimize safety hazards. Such safety hazards, as explained in the background of the invention, include outfeed zone hazard, kickback and wrong way feeding. As a result, the radial saw assembly 11 provides significantly improved safety and operational features for a radial saw during rip cutting.

An optional independent partial lower guard 77 may be located on the side of the lower blade guard 23 adjacent the motor (not shown). The independent partial lower guard 77 has an upper end 79 pivotally mounted at a single pivot point P to the upper fixed blade guard while a lower or second end 81 is slidably mounted to the lower blade guard 23. Specifically, the lower end 81 includes an integral overhanging finger 83 which fits within an elongated slot 85 of the lower blade guard 23, for slidably engaging marginal areas adjacent the slot 85 as the independent partial lower guard 77 is raised or lowered. As shown in FIG. 14 of the drawings, the independent partial lower guard 77 is automatically lifted by a workpiece W entering from the infeed side I. When moved to an upper portion of the elongated slot 85, the independent partial lower guard 77 can also raise the lower blade guard, independently of the link arm 45. The purpose of the independent partial lower guard is to partially block careless hand contact with the motor driven saw blade 15 from the side adjacent the motor (not shown).

During cross cutting operations, the radial saw assembly 11 is positioned as illustrated in FIGS. 4-5 of the drawings where it extends generally transverse to the fence 13. As explained above, this is accomplished by rotating the radial saw assembly, via the yoke assembly 19, relative to the supporting arm 9, in order to position the radial saw assembly to that illustrated in FIGS. 4-5 of the drawings. The lower blade guard 23 is raised automatically by workpieces of different thickness fed along the infeed side I during rip cutting; however, during cross cutting, the lower blade guard must be raised up and over the fence 13 and workpiece W at the start of the cross cut. As explained above, the trigger mechanism 55 in the handle 17, when squeezed from an initial to a depressed condition as shown in FIGS. 12-13, causes the slidable link arm 45 to move to the left, as illustrated in FIG. 13, causing the lower blade guard 23 to move upwardly relative to the upper blade guard 21. This enables the lower blade guard 23 to be moved up and over the fence 13 and workpiece W, but allows the lower blade guard 23 to return automatically to the down position when the motor driven saw blade 15 is positioned behind the fence 13 after the cross cutting operation, and the trigger mechanism 55 is released.

In addition to the protection afforded by the upper and lower blade guards 21, 23 during cross cutting, the riving knife 67 and anti-kickback pawls 69, 69, including kickback pawl bracket 75, partially block hand contact with the motor driven saw blade 15 when lowered to just above the workpiece surface during cross cutting operations. In addition, the lower blade guard 23 prevents carriage and blade roll forward past the fence 13 when set up for cross cuts, while the fence 13 is located in front of the lower blade guard 23.

From the foregoing, it will be appreciated that radial saw safety guards and barriers which have been constructed in accordance with the teachings of the present invention eliminate numerous safety hazards, while enhancing the operational efficiency of a radial saw during rip cutting and cross cutting operations. Although the radial saw is operated in fixed and moving relationship in two different directions for rip cutting and cross cutting, the radial saw safety guards and barriers of the present invention have been constructed to provide independent and alternative use, as explained above, in rip cutting and cross cutting operations.

In view of the above, it will be seen that the several objects and features of this invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

I claim:

1. A radial saw for rip cutting and cross cutting workpieces comprising:

a motor driven saw blade mounted on a yoke depending from a supporting arm that overhangs a worktable, said motor driven saw blade being movable relative to a worktable mounted fence to enable said motor driven saw blade to be operated for rip cutting of workpieces longitudinally along the length of the fence and for cross cutting of workpieces transverse to the fence;

an upper blade guard mounted in fixed position relative to said yoke mounted motor driven saw blade for covering approximately an upper half of the motor driven saw blade;

a lower blade guard depending from the upper blade guard and substantially covering approximately the lower half of the motor driven saw blade when resting on the worktable, said lower blade guard being mounted to the upper blade guard for automatic upward and downward movement relative to the upper blade guard when resting upon workpieces of different thickness to protect a user against contact with the motor driven saw blade; and said lower blade guard including a wrong way feed barrier during rip cutting.

2. The radial saw as defined in claim 1 wherein the wrong way feed barrier of the lower blade guard includes a blunt transverse wall in said lower blade guard along an outfeed end, said blunt transverse wall cooperating with the mounting of the lower blade guard to the upper blade guard to provide the wrong way feed barrier during rip cutting.

3. The radial saw as defined in claim 2 including link arms pivotally attached at an angle to said upper and lower blade guards, the angle of said link arms cooperating with the blunt transverse wall to prevent workpiece entry from the outfeed end of the lower blade guard during rip cutting.

4. The radial saw as defined in claim 3 wherein the lower blade guard along an infeed end has a curved shape which cooperates with the angle of the link arms between the upper and lower blade guards to facilitate automatic upward and downward movement of the lower blade guard relative to the upper blade guard for workpiece entry from the infeed end of the lower blade guard during rip cutting.

5. The radial saw as defined in claim 1 where the lower blade guard is configured to protect a user against contact with the side of the motor driven saw blade and at an infeed end of the motor driven saw blade during cross cutting.

6. The radial saw as defined in claim 5 and including means to raise the lower blade guard at the start of cross cutting.

7. The radial saw as defined in claim 6 wherein the means to raise the lower blade guard includes hand operated trigger means connected to the lower blade guard for raising same.

8. The radial saw as defined in claim 5 and further including an independent partial lower guard on one side of the lower blade guard and having one end pivotally mounted on the upper blade guard and a second end slidably mounted on said lower blade guard, said independent partial lower guard configured to rest upon a workpiece supported by the worktable and constructed to automatically lift the lower blade guard by a workpiece at the infeed end of the motor driven saw blade during rip cutting, said independent partial lower guard also constructed to be lifted by the lower guard when raised for cross cutting.

9. The radial saw as defined in claim 1 wherein the lower blade guard is pivotally and slidably mounted to the upper blade guard for relative upward and downward movement.

10. The radial saw as defined in claim 9 including link arms pivotally attached to both the upper and lower blade guards on opposite sides thereof, one of said link arms also being interconnected to a slidable link arm mounted to the upper blade guard.

11. The radial saw as defined in claim 10 wherein the slidable link arm is part of a pull link that includes a slot at one end for slidably engaging a cam follower fixed to the upper blade guard and a transversely extending pull section at an opposite end of the pull link, said pull link moving said link arms to cause the lower blade guard to move upwardly relative to the upper blade guard when the pull section is engaged to operate the pull link in a particular direction.

12. The radial saw as defined in claim 11 wherein the pull section of the pull link is engaged by a hand operated trigger mechanism that is operably associated with a handle for moving the motor driven saw blade, said hand operated trigger mechanism being operable for lifting the blade guard up and over the rip fence prior to cross cutting of the workpiece.

13. The radial saw as defined in claim 11 and further including an independent lift tab on said pull link on an opposite end from said pull section for manually engaging and lifting said lower blade guard relative to said upper blade guard.

14. A radial saw for rip cutting and cross cutting workpieces comprising:
   a motor driven saw blade mounted on a yoke depending from a supporting arm that overhangs a worktable, said motor driven saw blade being movable relative to a worktable mounted fence to enable said motor driven saw blade to be operated for cutting of workpieces longitudinally along the length of the fence and for cross cutting of workpieces transverse to the rip fence;
   an upper blade guard mounted in fixed position relative to said yoke mounted motor driven saw blade for covering approximately an upper half of the motor driven saw blade;
   a lower blade guard mounted to the upper blade guard for substantially covering approximately the lower half of the motor driven saw blade, said lower blade guard operable for upward and downward movement relative to the upper blade guard during cutting by said motor driven saw blade while protecting a user against contact;
   wrong way feed barrier means associated with said lower blade guard; and
   adjustable outfeed user barrier means mounted to said upper blade guard for protecting the user during rip cutting, said adjustable outfeed user barrier means also being capable of protecting the user from a leading edge of the motor driven saw blade during cross cutting.

15. The radial saw as defined in claim 14 and further including adjustable hold down means to hold a workpiece close to the worktable at the front of the motor driven saw blade during rip cutting.

16. The radial saw as defined in claim 15 wherein the adjustable hold down means includes an elongated slot which cooperates with a fastener extending therethrough and mounted to the upper blade guard for adjustably positioning the hold down in a fixed position just above the workpiece during rip cutting.

17. The radial saw as defined in claim 16 wherein the adjustable outfeed user barrier means includes a riving knife for positionment within a workpiece kerf behind the motor driven saw blade during rip cutting.

18. The radial saw as defined in claim 17 wherein the adjustable riving knife is capable of being lowered to a short distance above a workpiece surface to partially block hand contact at a leading edge of the motor driven saw blade during cross cutting.

19. The radial saw as defined in claim 18 wherein the adjustable riving knife includes an elongated slot which cooperates with a fastener extending therethrough mounted to the upper blade guard for adjustably positioning the riving knife in the workpiece kerf behind the motor driven saw blade during rip cutting.

20. The radial saw as defined in claim 19 wherein the adjustable outfeed user barrier means further includes adjustable anti-kickback pawls for engaging the workpiece on both sides of the workpiece kerf behind the motor driven saw blade during rip cutting.

21. The radial saw as defined in claim 20 wherein the adjustable kickback pawls are mounted to a pawl supporting bracket that is substantially complementary configured similar to the riving knife, the pawl supporting bracket being slidably mounted relative to the riving knife and including an elongated slot complementary configured to the elongated slot of the riving knife, and said fastener extending through both of the elongated slots in the riving knife and pawl supporting bracket for adjustably and independently positioning the riving knife and anti-kickback pawls to accommodate workpieces of different thickness.

22. The radial saw as defined in claim 21 wherein the lower blade guard adjacent the riving knife and anti-kickback pawls includes notches formed at a lower end of a transverse wall to assist in clearing corners of workpieces during bevel rip cuts near an edge of the workpiece.

23. The radial saw as defined in claim 15 wherein the upper blade guard includes an exhaust port for the removal of sawdust, and said adjustable hold down means is configured to direct sawdust into the upper blade guard toward the sawdust exhaust port.

24. The radial saw as defined in claim 14 wherein the lower blade guard is formed from transparent plastic material.

25. A radial saw for rip cutting and cross cutting workpieces supported on a worktable comprising:
   a motor driven saw blade mounted on a yoke depending from a supporting arm that overhangs the worktable, said motor driven saw blade being movable relative to a rip fence that extends upwardly from the worktable, said motor driven saw blade being operable for rip cutting of workpieces longitudinally along the length of the rip fence and for cross cutting of workpieces transverse to the rip fence;
   an upper blade guard mounted in fixed position relative to said yoke mounted motor driven saw blade for covering approximately an upper half of the motor driven saw blade;
   a lower blade guard depending from the upper blade guard and partially covering approximately the lower half of the motor driven saw blade when resting on the worktable, said lower blade guard being mounted to the upper blade guard for automatic upward and downward movement relative to the upper blade guard upon engaging workpieces of different thickness supported by the worktable, said lower blade guard being configured to protect a user against contact with the side of a motor driven blade during cross cutting or rip cutting and against contact at an outfeed end of the motor driven saw blade during rip cutting;
   said lower blade guard including a wrong way feed barrier during rip cutting;
   manually operated means to raise the lower blade guard at the start of cross cutting;
   an adjustable hold down mounted to the upper blade guard for holding a workpiece close to the worktable at the front of the motor driven saw blade during rip cutting;
   an adjustable riving knife mounted to the upper blade guard for positionment within a workpiece kerf behind the motor driven saw blade during rip cutting; and
   adjustable anti-kick pawls for engaging the workpiece on both sides of the workpiece kerf behind the motor driven saw blade during rip cutting.

* * * * *

UNITED STATES PATENT AND TRADEMARK OFFICE
CERTIFICATE OF CORRECTION

PATENT NO. : 5,287,779
DATED : February 22, 1994
INVENTOR(S) : James I. Metzger, Jr.

It is certified that error appears in the above-indentified patent and that said Letters Patent is hereby corrected as shown below:

Column 11, Line 21, delete "block" and insert -- blocks --
Column 12, Line 17, delete "2" and insert -- 23 --

Signed and Sealed this

Twentieth Day of December, 1994

Attest:

BRUCE LEHMAN

*Attesting Officer*         *Commissioner of Patents and Trademarks*